United States Patent
Lester et al.

(10) Patent No.: US 7,930,384 B1
(45) Date of Patent: Apr. 19, 2011

(54) ENCODING AD AND/OR AD SERVING INFORMATION IN A CLICK URL

(75) Inventors: Chad Lester, Redwood City, CA (US); Eric Veach, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 1109 days.

(21) Appl. No.: 10/749,110

(22) Filed: Dec. 29, 2003

Related U.S. Application Data

(60) Provisional application No. 60/442,209, filed on Jan. 24, 2003.

(51) Int. Cl.
*G06F 15/173* (2006.01)
*G06Q 30/00* (2006.01)

(52) U.S. Cl. .................. 709/224; 705/14.41; 705/14.69; 705/14.73

(58) Field of Classification Search .................. 705/14, 705/26, 14.41, 14.69, 14.73; 709/270, 217, 709/224
See application file for complete search history.

(56) References Cited

U.S. PATENT DOCUMENTS

| | | | |
|---|---|---|---|
| 5,724,424 A | 3/1998 | Gifford | |
| 5,794,210 A | 8/1998 | Goldhaber et al. | |
| 5,901,287 A | 5/1999 | Bull et al. | |
| 5,937,390 A | 8/1999 | Hyodo | |
| 5,948,061 A | 9/1999 | Merriman et al. | |
| 5,959,623 A | 9/1999 | Van Hoff et al. | |
| 5,960,409 A | 9/1999 | Wexler | |
| 2002/0010757 A1* | 1/2002 | Granik et al. ................. | 709/218 |
| 2003/0035139 A1* | 2/2003 | Tomita et al. ................. | 358/1.15 |
| 2003/0101271 A1* | 5/2003 | Smith et al. .................... | 709/229 |
| 2004/0054588 A1* | 3/2004 | Jacobs et al. ..................... | 705/14 |
| 2004/0054589 A1* | 3/2004 | Nicholas et al. ................ | 705/14 |
| 2004/0083133 A1* | 4/2004 | Nicholas et al. ................ | 705/14 |
| 2004/0117259 A1* | 6/2004 | Morrisroe et al. .............. | 705/14 |
| 2005/0086309 A1* | 4/2005 | Galli et al. ..................... | 709/206 |

OTHER PUBLICATIONS

T. Berners-Lee, et al, "Uniform Resource Identifiers (URI): General Syntax," *Network Working Group, Request for Comments: 2396* (Aug. 1999).
comp.infosystems.www.providers Mar. 14, 1995 posting.
FocaLink business plan dated Jun. 6, 1995.
Nov. 7, 1995 email from Jason Strober to Ron Kovas, David Zinman, and Karen Johnson.
Nov. 13, 1995 email from Jason Strober to Jennifer Ratner, copying Ron Kovas, David Zinman, and Michael Wang.
Nov. 21, 1995 email from Jason Strober to "aroskey@nww.com".
Dec. 5, 1995 email from Jennifer Ratner to wigley@utne.com.
Dec. 12, 1995 email from Michael Wang to Jason Strober.
Major Companies, Ad Agencies Using New Internet Ad Server; Focalink's SmartBanner Enables Cost-Effective Marketing on the Web, Business Wire, Feb. 5, 1996.
comp.infosystems.www.servers.unix Feb. 15, 1996 posting.

(Continued)

*Primary Examiner* — Larry Donaghue
*Assistant Examiner* — Brian J Gillis
(74) *Attorney, Agent, or Firm* — John C. Pokotylo; Straub & Pokotylo

(57) ABSTRACT

The tracking of ad selections (such as ad clicks for example), and/or rich levels of ad performance may be facilitated by encoding one or more ad properties in a click URL of the ad. An intermediate URL server may be used to decode such ad properties when the ad is selected. Ad properties may include an identity of the ad; an identity of the advertiser; and/or various other ad serving parameters.

18 Claims, 4 Drawing Sheets

OTHER PUBLICATIONS

Mar. 14, 1996 "Welcome to FocaLink!" promotional package.
Declaration of Dwight Merriman (Feb. 9, 2001).
Preliminary Invalidity Contentions, *Web Tracking Solutions LLC and Daniel Wexler* vs *Google Inc.*, Civil Action No. 1:08-CV-03139, dated Jun. 26, 2009 (12 pgs.).
Preliminary Invalidity Contentions (Exhibits), *Web Tracking Solutions LLC and Daniel Wexler* vs *Google Inc.*, Civil Action No. 1:08-CV-03139 (60 pgs.) (Jun. 26, 2009).
CERN WebServer Config/Rules (Web page), 1994.
CERN WebServer httpd Guide, 1994.
Edelbrock & Borwankar, Building Successful Internet Businesses, IDG Books Worldwide, Inc., US, 1996.
getrequest.cpp file.
GN WebServer version 2.24 code cgi.c file.
Graham, Ian S., HTML Sourcebook, John Wiley & Sons (1995) (ISBN 0471118494).
Internet Draft: HyperText Transfer Protocol—HTTP/1.0, pp. 1-46, 1996.
Internet Draft: Bassic HTTP as Defined in 1992.
Kohda & Endo, Ubiquitous Advertising on the WWW: Merging Advertisement on the Browser, 1996.
log.cpp file.
Meeker, Mary, The Internet Advertising Report, HarperBusiness, US, 1997.
NCSA HTTPd v. 1.4.2 code (src/http_config.c), 1995.
NCSA HTTPd v. 1.4.2 code(src/http_log.c), 1995.
NCSA HTTPd v. 1.4.2 code (src/http_script.c), 1995.
Novak & Hoffman, New Metrics for New Media: Toward the Development of Web Measurement Standards, 1996.
O'Reilly, Tim, Publishing Models for Internet Commerce, Communications of the ACM, Jun. 1996/vol. 39, No. 6, pp. 79-86.
RFC 1945, 1996.
"The Rise of the Infomediary," The Economist, Jun. 24, 1999.
Zeff & Aronson, Advertising on the Internet (1st ed.), 1997.
Apache WebServer 1.0 code mod_alias.c file, 1995.
Apache WebServer 1.0 Documentation, 1995.
CERN WebServer httpd CGI/HTImageDoc (Web page), 1994.
CERN WebServer httpd Documentation files CGI/Overview (Web page), 1994.
NCSA HTTPd v. 1.4.2 code (cgi-bin/srm.conf-dist).
NCSA HTTPd v. 1.5 Documentation file HTTPd.ps, 1995.
PHP Programming Language Source Code version 1.08 phpl.c file, 1995.
Spinner v. 1.0b12 WebServer code (server/modules/cgi.lpc).
Spinner v. 1.0b12 WebServer code (server/modules/directories.lpc).
Spinner v. 1.0b12 WebServer code (server/modules/htaccess.lpc).
Spinner v. 1.0b12 WebServer code (server/modules/mainconfig.lpc).
Spinner v. 1.0b12 WebServer code (server/modules/redirect.lpc).
Spinner WebServer Documentation configuration (configuration/specific).
Spinner WebServer Documentation configuration (faq).
Spinner WebServer Documentation configuration (modules).
Spinner WebServer Documentation configuration (mods/relay).
Spinner WebServer Documentation configuration (redirect).
Spinner WebServer Documentation configuration (server/modules/htaccess.lpc).
*Ex parte Merriman et al*, Appeal No. 2009-005869, (BPAI May 20, 2010) (26 pgs.)

* cited by examiner

ENCODING AD AND/OR AD SERVING INFORMATION IN A CLICK URL

§0. RELATED APPLICATIONS

This application claims the benefit of U.S. Provisional Application Ser. No. 60/442,209, titled "METHOD FOR ENCODING ADVERTISEMENT INFORMATION IN A CLICK URL," filed on Jan. 24, 2003 and listing Eric Hugh Veach and Chad Lester as the inventors. That application is expressly incorporated herein by reference. The present invention is not limited to any requirements described in the provisional application.

§1. BACKGROUND OF THE INVENTION

§1.1 Field of the Invention

The present invention concerns advertising. In particular, the present invention concerns tracking ad selection and ad performance.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it may be very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to narrower niche audiences, thereby increasing the likelihood of a positive response by the audience. For example, an agency promoting tourism in the Costa Rican rainforest might place ads on the ecotourism-travel subdirectory of the Yahoo Website. An advertiser will normally determine such targeting manually.

Regardless of the strategy, Website-based ads (also referred to as "Web ads") are often presented to their advertising audience in the form of "banner ads"—i.e., a rectangular box that includes graphic components. When a member of the advertising audience (referred to as a "viewer" or "user" in the specification without loss of generality) selects one of these banner ads by clicking on it, embedded hypertext links typically direct the viewer to a page on the advertiser's Website (referred to as an "ad landing page" or simply a "landing page"). This process, wherein the viewer selects an ad, is commonly referred to as a "click-through" ("Click-through" is intended to cover any user selection.). The ratio of the number of click-throughs to the number of impressions of the ad (i.e., the number of times an ad is rendered) is commonly referred to as the "click-through rate" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering with a Website, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

The serving of ads can be priced in various ways. Common examples include cost per impression (CPI) and cost per action (CPA), where "action" refers to some desired activity of the user such as selecting (or clicking) the ad, purchasing a product, signing up for a service, or some other "conversion." Initially, online advertising was generally priced per impression (e.g., per thousand impressions). However, pricing schemes which more closely align online advertising costs with the desired results of the advertiser (e.g., having a user visit the advertiser's Website, having a user consummate a commercial transaction on the advertiser's Website, etc.) have become more popular. To track user selections (clicks), the links in some ads may include links that first direct the user's content rendering application (e.g., a browser) to one or more intermediate resources or servers (e.g., using one or more URLs). These servers associated with intermediate URLs (simply referred to as "intermediate URL servers" without loss of generality) can direct the user's content rendering application (e.g., a browser) to a server that can record the selection (click event) before forwarding the user's content rendering application to a subsequent server (which may be the server storing the ad landing page). Note that in addition to tracking selections for billing purposes, selections can be used to derive ad performance metrics. Such metrics may be used for various purposes such as positioning ads or applying relative rendering attributes, ad campaign assistance, governing the serving of ads, etc. As can be appreciated from the foregoing, there is a need for methods and apparatus that allow clicks to be tracked. Moreover, such tracking should support performance monitoring, perhaps supporting rich levels of performance monitoring.

§2. SUMMARY OF THE INVENTION

The present invention helps to track ad selections, such as ad clicks. The present invention may also help to track rich levels of ad performance. The present invention may do so by encoding one or more ad properties, such as an identity of the ad; an identity of the advertiser; a time the ad was served; a time the ad was rendered; a rendering attribute of the ad; a position of the ad within a Web page; a price that the advertiser will be charged for the impression; a price that the advertiser will be charged for a click; a price that the advertiser will be charged for a conversion; an identity of the server that chose the ad; search conditions that generated the page with which the ad was rendered; a next intermediate URL; a final destination URL; an identity of the ad creative; a topic of the content or other information about the content with which the ad was served (e.g. one or more concepts associated with the Web page on which the advertisement was displayed); an identity of the content with which the ad was served; information about other advertisements that were rendered along with the ad; a geolocation to which the ad was served; and user profile information of the user to which the ad was served, various other ad serving parameters, etc., in a click URL of the ad.

An intermediate URL server may be used to decode such ad properties when the ad is selected.

§3. BRIEF DESCRIPTION OF THE DRAWINGS

§4. DETAILED DESCRIPTION

The present invention may involve novel methods, apparatus, message formats, and/or data structures for encoding ad property information and providing such encoded information in a click URL. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in §4.1. Then, exemplary embodiments of the present invention are described in §4.2. Finally, some conclusions regarding the present invention are set forth in §4.3.

§4.1 Environments in which, or with which, the Present Invention May Operate

§4.1.1 Exemplary Advertising Environment

Figure 1:
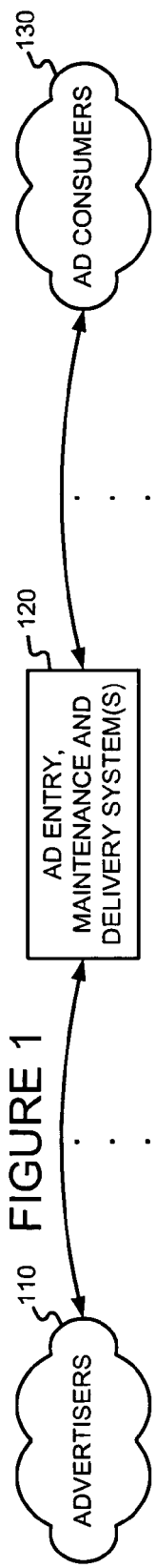
FIG. 1 is a high-level diagram showing parties or entities that can interact with an advertising system.

FIG. 1 is a diagram of an advertising environment. The environment may include an ad entry, maintenance and delivery system (simply referred to an ad server) 120. An exemplary ad server 120 is described in U.S. patent application Ser. No. 10/610,311 (incorporated herein by reference), titled "PROMOTING AND/OR DEMOTING AN ADVERTISE-MENT FROM AN ADVERTISING SPOT OF ONE TYPE TO AN ADVERTISING SPOT OF ANOTHER TYPE," filed on Jun. 30, 2003 and listing Chad Lester as the inventor, with reference to FIG. 2. Advertisers 110 may directly, or indirectly, enter, maintain, and track ad information in the system 120. The ads may be in the form of graphical ads such as so-called banner ads, text only ads, image ads, audio ads, video ads, ads combining one or more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or, observed user behavior related to ads that have been served. Ad property information may also be provided to the system. As will be discussed below, such information may be encoded by the ad system 120 (e.g., when the ad is served) and gathered by an intermediate URL server.

Figure 2:
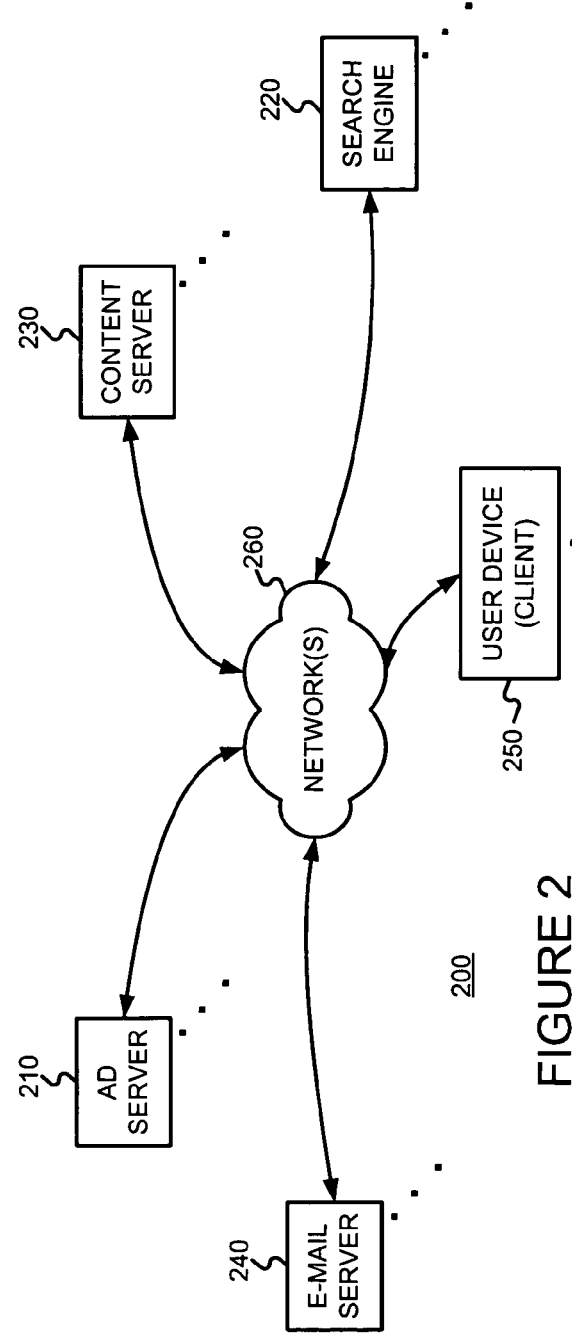
FIG. 2 illustrates an environment in which advertisers can target their ads on search results pages generated by a search engine, documents served by content servers, and/or e-mail.

FIG. 2 illustrates an environment 200 in which the present invention may be used. A user device (also referred to as a "client" or "client device") 250 may include a content rendering facility such as a browser facility (such as the Opera browser, the Explorer browser from Microsoft, or the Navigator browser from AOL/Time Warner), an e-mail facility (e.g., Outlook from Microsoft), etc. A search engine 220 may permit user devices 250 to search collections of documents (e.g., Web pages). A content server 210 may permit user devices 250 to access documents. An e-mail server (e.g., Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220, content provided by the content server 230, and/or e-mail supported by the e-mail server 240 and/or user device e-mail facilities.

Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geolocation information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Exemplary content-relevant ad servers are described in U.S. patent application Ser. No. 10/375,900 (incorporated herein by reference), titled "SERVING ADVERTISEMENTS BASED ON CONTENT," filed on Feb. 26, 2003 and listing Darrell Anderson, Paul Bucheit, Alexander Paul Carobus, and Yingwei Cui as inventors. Finally, the content server 230 may transmit information about the ads and how, when, and/or where the ads are to be rendered, and/or ad performance (e.g., position, click-through or not, impression time, impression date, size, conversion or not, etc.) back to the ad server 120/210. Alternatively, or in addition, such information may be provided back to the ad server 120/210 by some other means. For example, such information may be encoded and provided in a click URL provided with the ad and decoded by an intermediate URL server.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered, and/or ad performance (e.g., position, click-through or not, impression time, impression date, size, conversion or not, etc.) back to the ad server 120/210. Alternatively, or in addition, such information may be provided back to the ad server 120/210 by some other means. For example, such information may be encoded and provided in a click URL provided with the ad and decoded by an intermediate URL server.

Finally, as discussed in U.S. patent application Ser. No. 10/452,830 (incorporated herein by reference), titled "SERVING ADVERTISEMENTS USING INFORMATION ASSOCIATED WITH E-MAIL," filed on Jun. 2, 2003 and listing Jeffrey A. Dean, Georges R. Hark and Paul Bucheit as inventors, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under, over, or otherwise in association with an e-mail.

§4.1.3 DEFINITIONS

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Geolocation information" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, etc. It may include latitude and/or longitude, or a range thereof. It may include information, such as an IP address, from which a user location can be estimated.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

"Ad properties" may include ad information, such as one or more ad features, and/or one or more serving parameters.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 EXEMPLARY EMBODIMENTS

The present invention may help to track ad selections and various types of ad performance. The present invention may do so by encoding one or more ad properties.

Figure 3:
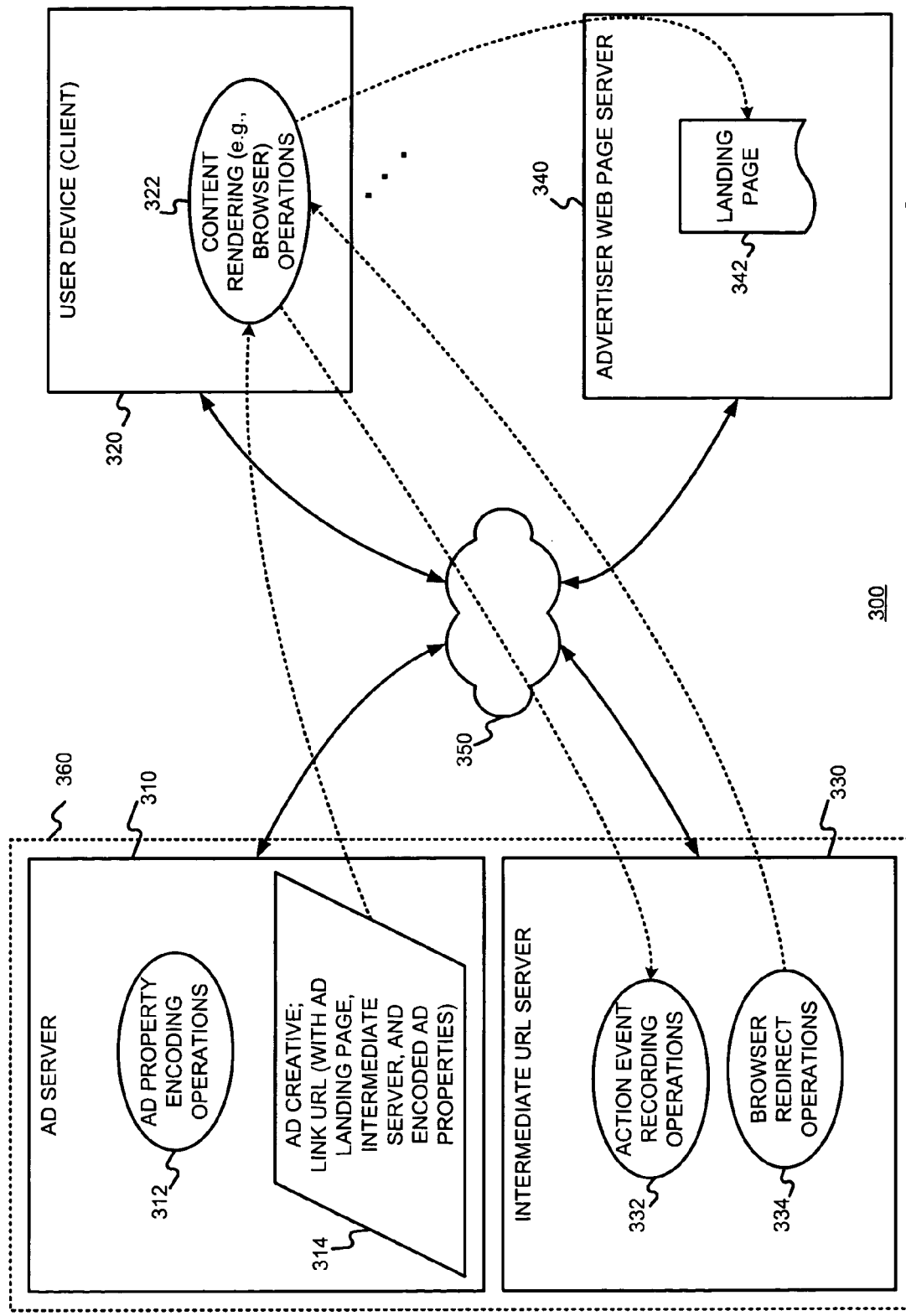
FIG. 3 is a bubble diagram of operations that may be performed consistent with the present invention.

FIG. 3 is a bubble diagram of operations that may be performed consistent with the present invention. In the exemplary environment 300 shown, an ad server 310 may be used to provide ads or ad information 314 to content rendering (e.g., browser) operations 322 on a user device 320. Although the following description discusses browsers and Web pages, the present invention is applicable to other content rendering applications or devices and other documents. When a user selects an ad, the browser 322 renders (goes to) a landing page 342 specified in the ad information 314. Thus, advertisements 314 displayed (or otherwise rendered) on the Web may include a link, which when followed, will ultimately lead the browser 322 to a Web page 342 of (the advertiser's) web site server 340. However, this link may first direct the browser 322 to one or more intermediate URLs. These intermediate URLs can direct the browser 322 to an intermediate URL server 330. At the intermediate URL server 330, action event recording operations 332 can record the user selection (e.g., click event) and browser redirect operations 334 can forward the browser 322 to a subsequent URL, such as that of the landing page 342 for example. The various servers 310, 320, 330, and 340 can communicate with one another via one or more networks 350, such as the Internet for example. As indicated by dashed line 360, the ad server 310 and the intermediate URL server 330 may reside at the same location, and/or may be under control of the same entity.

Ad property encoding operations 312 may be used to generate an intermediate URL that encodes one or more properties of the ad, such as an identity of the ad; an identity of the advertiser; a time (local at server or local at user device) the ad was served; a time (local at server or local at user device) the ad was rendered; a rendering attribute of the ad; a position of the ad within a Web page; a price that the advertiser will be charged for the impression; a price that the advertiser will be charged for a click; a price that the advertiser will be charged for a conversion; an identity of the server that chose the ad; search conditions that generated the page with which the ad was rendered; a next intermediate URL; a final destination URL; an identity of the ad creative; a topic of the content or other information about the content with which the ad was served (e.g., one or more concepts associated with the Web page on which the ad was displayed); an identity of the content with which the ad was served; information about other ads that were rendered along with the ad; a geolocation to which the ad was served; and user profile information of the user to which the ad was served, various other ad serving parameters, etc.

Ad properties may be encoded as a sequence of key-value pairs within the URL, where the key identifies the kind or type of property that the value is referring to. Alternatively, properties can be encoded as a sequence of values within the URL, where an absolute or relative position of each of the values within the sequence is used to identify the kind of property that the value corresponds to. Both of these techniques can be combined. In one embodiment, such an intermediate URL with encoded ad properties complies with the syntax requirements specified in the paper, T. Berners-Lee, et al, "Uniform Resource Identifiers (URI): General Syntax," *Network Working Group, Request for Comments:* 2396 (August 1998) (incorporated herein by reference and referred to as "RFC 2396").

Exemplary methods for performing these operations are described in §4.2.1 below. Exemplary apparatus are described in §4.2.2 below. Finally, various refinements and alternatives are described in §4.2.3 below.

§4.2.1 Exemplary Methods

Figure 4:
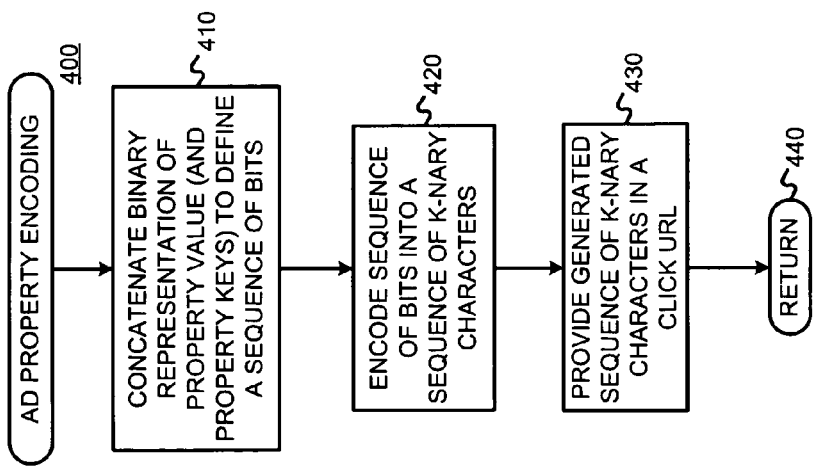
FIG. 4 is a flow diagram of an exemplary method that may be used to provide encoded ad property information in a click URL in a manner consistent with the present invention.

FIG. 4 is a flow diagram of an exemplary method 400 that may be used to encode ad property information in a manner consistent with the present invention. Property values (and property keys if they are included) may be represented as characters, such as ASCII characters. These characters may have binary representations. These binary representations may be concatenated to define a sequence of bits. (Block 410) The sequence of bits may then be encoded into a sequence of K-nary characters. (Block 420) The generated sequence of K-nary characters may then be provided in a click URL (Block 430) before the exemplary method 400 is left (Node 440).

Referring back to 420, K may represent a number of legal characters. For example, if legal characters for a click URL are limited to upper and lower alpha characters, digits, and the marks "-" "_" "." "!" "~" "*" "'" "(" and ")", K may be 71 (=26+26+10+9). The encoding scheme may use a subset of the legal characters, but this may cause the encoded information to be longer. Property keys and values might be in the form of numbers or sequences of ASCII characters. These numbers or sequences of ASCII characters can be encoded into a legal URL in such a way that they can be decoded.

Figure 5:
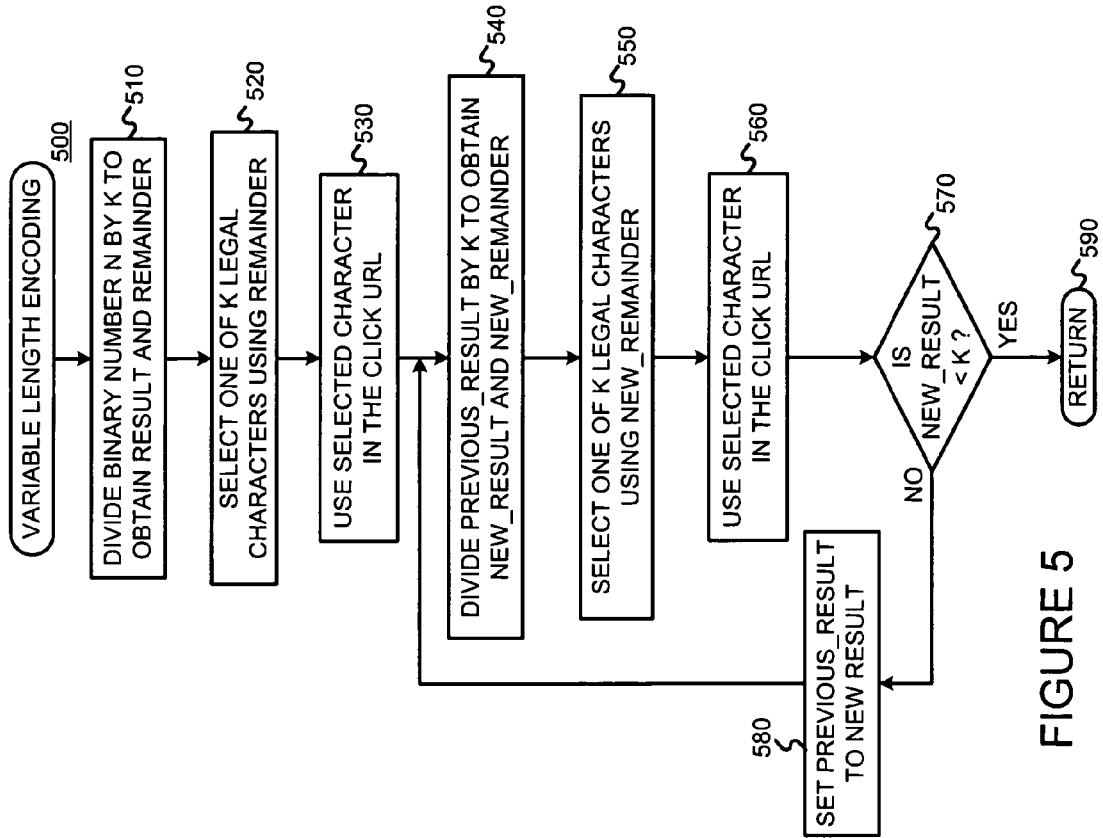
FIG. 5 is a flow diagram of an exemplary method that may be used to encode variable length information in a manner consistent with the present invention.

FIG. 5 is a flow diagram of an exemplary method 500 that may be used to encode information, such as variable length information, (Recall, e.g., block 420 of FIG. 4.) in a manner consistent with the present invention. The sequence of bits (Recall block 410 of FIG. 4.) can be thought of as a large number, N. An enumerated list of characters that are legal within a URL is chosen for encoding and decoding. If there are K legal characters in the list, then N can be represented by N log K characters. N is divided by K to obtain a result and a remainder. (Block 510) Since the remainder will be a number between 0 and K−1, it may be used to choose a legal character from the enumerated list of legal characters. (Block 520) The chosen legal character may then be used in the click URL. (Block 530) The whole number result of the division may then be repeatedly divided by K (Block 540), the sequence of remainders is used to choose a sequence of characters from the K legal characters (Block 550), and the chosen characters are used in the click URL (Block 560). As indicated by decision block 570 and block 580, this process is repeated if the whole number result is not less than K. If the whole number result is less than K, the exemplary method 500 is left (Node 590).

§4.2.2 EXEMPLARY APPARATUS

Figure 6:
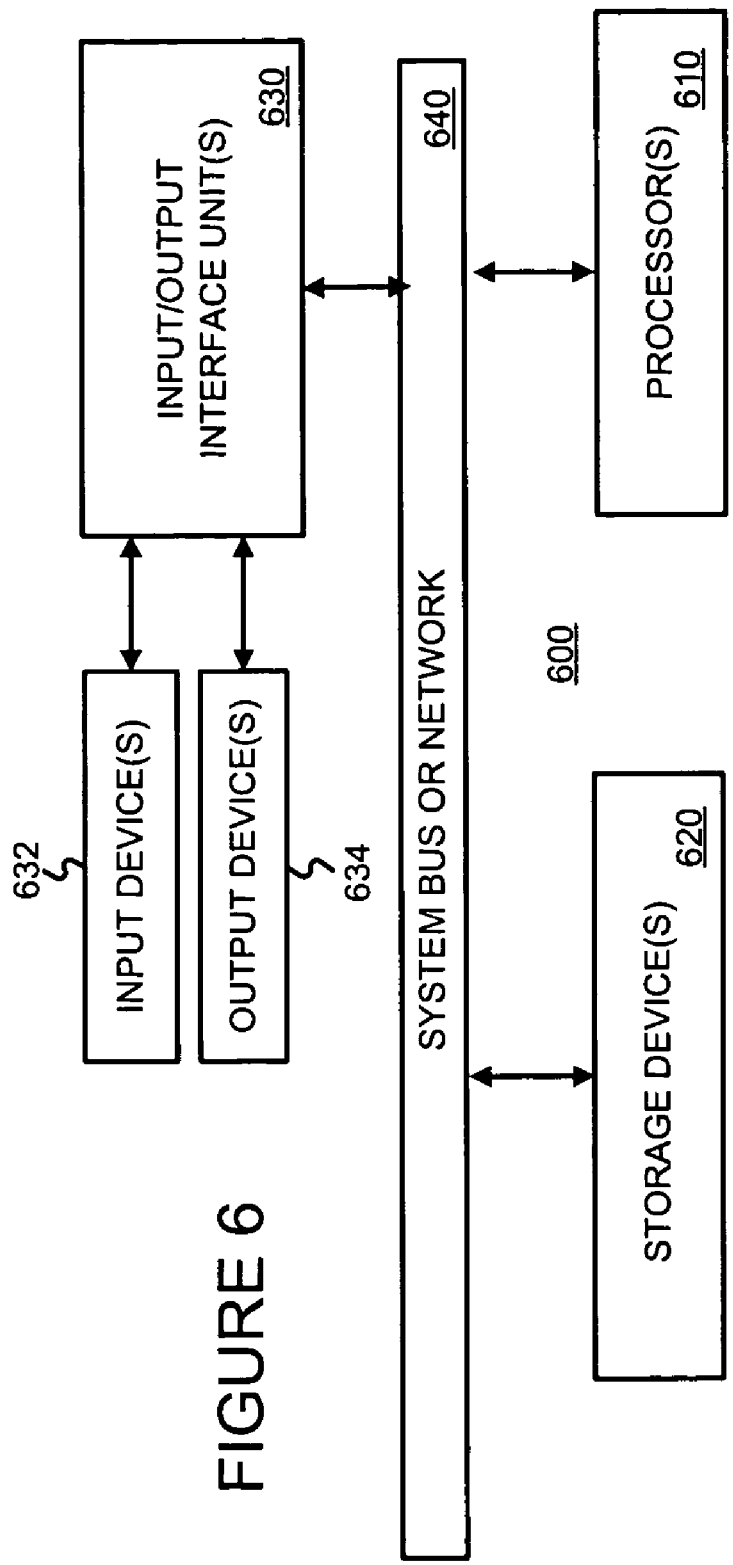
FIG. 6 is a block diagram of apparatus that may be used to perform at least some of the various operations that may be used, and store at least some of the information that may be used and/or generated, in a manner consistent with the present invention.

FIG. 6 is high-level block diagram of a machine 600 that may be used to perform one or more of the operations discussed above. The machine 600 may include one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 620 and/or may be received from an external source via one or more input interface units 630.

In one embodiment, the machine 600 may be one or more conventional personal computers. In this case, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

The ad server 210, user device (client) 250, search engine 220, content server 230, and/or e-mail server 240 may be implemented as one or more machines 600.

§4.2.3 Refinements and Alternatives

To ensure that the properties encoded in the URL are genuine, a digital signature can be created from the property values, and/or from part of or the entire encoded URL. If a private key is used to help generate the digital signature, then the author of the URL and properties can be verified. The digital signature may be generated using algorithms such as HMAC or other algorithms known in the art. The digital signature can be encoded within the URL just like any other property.

In a refined embodiment of the present invention, 64 enumerated characters may be provided (i.e., K=64) that are legal within a URL. This technique results in removing an integral number of bits from the binary representation of N and is therefore efficient to implement on modern microprocessors. Alternatively, K may be $2^x$, and preferably less than 72. Thus, for example, K may be 2, 4, 8, 16, 32 and 64.

In some embodiments of the present invention, certain characters may be excluded from the set of K legal characters. For example, in one embodiment, one or more of the characters "control" "space" "<" ">" and "%" are excluded. In another embodiment, one or more of the characters "{" "}" "|" "\" "^" "[" "]" and """ are excluded.

In certain embodiments of the present invention, numbers may be represented by fewer bits using variable length encoding techniques. One technique is to represent a number as a sequence of shorter fixed bit-length numbers. For example, these shorter numbers may be one byte each. One bit within the shorter fixed-length number may be used as a continuation bit. The other bits may be used to represent value bits for the original number. Value bits from the fixed bit-length numbers may be accumulated until a fixed bit-length number whose continuation bit is reset is encountered. The value bits may then be combined to form the number.

§4.3 CONCLUSIONS

As can be appreciated from the foregoing disclosure, the present invention can be used to help track ad selections and/or ad performance by encoding ad properties into a click URL.

What is claimed is:

1. A computer-implemented method comprising:
a) encoding, with a computer system including at least one computer, ad properties of an ad and including the encoded ad properties in a click URL, wherein the encoded ad properties include all of (A) a topic or concept associated with a Web page with which the ad was served, (B) a time the ad was served or rendered, (C) information about other ads that were rendered along with the ad, (D) a geolocation to which the ad was served, (E) an identity of a server that chose the ad, and (F) a digital signature generated based on the other ad properties included in the click URL;
b) serving, with the computer system, the ad together with the click URL;
c) in response to a user selection of the ad,
 i) decoding, with the computer system, the encoded ad properties at an intermediate URL server, and
 ii) forwarding, with the computer system, a content rendering facility of the user to an ad landing page; and
d) using the encoded ad properties to perform, with the computer system, at least one of (1) tracking the performance of the ad and (2) determining advertiser charges for serving the ad.

2. The computer-implemented method of claim 1 wherein the act of encoding ad properties represents the encoded ad properties with characters from a set of K characters, where K is no more than 72.

3. The computer-implemented method of claim 2 wherein K is 64.

4. The computer-implemented method of claim 2 wherein K is 32.

5. The computer-implemented method of claim 2 wherein K is 16.

6. The computer-implemented method of claim 1 wherein the encoded ad properties are represented with a set of K characters, and wherein the set of K characters excludes one or more characters selected from a set of characters consisting of "control" "space" "<" ">" and "%".

7. The computer-implemented method of claim 1 wherein the encoded ad properties are represented with a set of K characters, and wherein the set of K characters excludes one or more characters selected from a set of characters consisting of "{" "}" "|" "\" "^" "[" and "]".

8. A computer-implemented method comprising:
a) encoding, with a computer system including at least one computer, ad properties of an ad and including the encoded ad properties in a click URL, wherein the encoded ad properties include all of (A) a topic or concept associated with a Web page with which the ad was served, (B) a time the ad was served or rendered, (C) information about other ads that were rendered along with the ad, (D) a geolocation to which the ad was served, (E) an identity of a server that chose the ad, and (F) a digital signature generated based on the other ad properties included in the click URL;
b) serving, with the computer system, the ad together with the click URL;
c) in response to a user selection of the ad,
 i) decoding, with the computer system, the encoded ad properties at an intermediate URL server, and
 ii) forwarding, with the computer system, a content rendering facility of the user to an ad landing page; and
d) using the encoded ad properties to perform, with the computer system, at least one of (1) tracking the performance of the ad and (2) determining advertiser charges for serving the ad,
 wherein the act of encoding the ad properties of the ad and including the encoded ad properties in the click URL includes:
 (1) representing, with the computer system, each of the ad properties of the ad with a binary value;
 (2) concatenating, with the computer system, each of the binary values to define a sequence of bits;
 (3) encoding, with the computer system, the sequence of bits into a sequence of characters, wherein each of the characters is selected from a set of K legal characters; and
 (4) providing, with the computer system, the sequence of characters in the click URL of the ad.

9. The computer-implemented method of claim 8 wherein the act of encoding the sequence of bits into a sequence of characters includes
 i) dividing, with the computer system, a number defined by the sequence of bits by K to obtain a result and a remainder,
 ii) selecting, with the computer system, one of the K legal characters using the remainder,
 iii) setting, with the computer system, the number to the result, and
 iv) repeating acts (i)-(iii) until the result is less than K.

10. Apparatus comprising:
one or more processors;
at least one input device; and
one or more storage devices storing processor-executable instructions which, when executed by one or more processors, perform a method of:
a) encoding ad properties of an ad and including the encoded ad properties in a click URL, wherein the encoded ad properties include all of (A) a topic or concept associated with a Web page with which the ad was served, (B) a time the ad was served or rendered, (C) information about other ads that were rendered along with the ad, (D) a geolocation to which the ad was served, (E) an identity of a server that chose the ad, and (F) a digital signature generated based on the other ad properties included in the click URL;
b) serving the ad together with the click URL;

c) in response to a user selection of the ad,
  i) "decoding the encoded ad properties at an intermediate URL server, and
  ii) forwarding a content rendering facility of the user to an ad landing page; and
d) using the encoded ad properties to perform, with the computer system, at least one of (1) tracking the performance of the ad and (2) determining advertiser charges for serving the ad.

11. The apparatus of claim 10 wherein the act of encoding ad properties represents the encoded ad properties with characters from a set of K characters, where K is no more than 72.

12. The apparatus of claim 11 wherein K is 64.

13. The apparatus of claim 11 wherein K is 32.

14. The apparatus of claim 11 wherein K is 16.

15. The apparatus of claim 10 wherein the encoded ad properties are represented with a set of K characters, and wherein the set of K characters excludes one or more characters selected from a set of characters consisting of "control" "space" "<" ">" and "%".

16. The apparatus of claim 10 wherein the encoded ad properties are represented with a set of K characters, and wherein the set of K characters excludes one or more characters selected from a set of characters consisting of "{" "}" "|" "\" "^" "[" and "]".

17. Apparatus comprising:
one or more processors;
at least one input device; and
one or more storage devices storing processor-executable instructions which, when executed by one or more processors, perform a method of:
  a) encoding ad properties of an ad and including the encoded ad properties in a click URL, wherein the encoded ad properties include all of (A) a topic or concept associated with a Web page with which the ad was served, (B) a time the ad was served or rendered, (C) information about other ads that were rendered along with the ad, (D) a geolocation to which the ad was served, (E) an identity of a server that chose the ad, and (F) a digital signature generated based on the other ad properties included in the click URL;
  b) serving the ad together with the click URL;
  c) in response to a user selection of the ad,
    i) decoding the encoded ad properties at an intermediate URL server, and
    ii) forwarding a content rendering facility of the user to an ad landing page; and
  d) using the encoded ad properties to perform, with the computer system, at least one of (1) tracking the performance of the ad and (2) determining advertiser charges for serving the ad,
wherein the act of encoding the ad properties of the ad and including the encoded ad properties in the click URL includes:
  (1) representing each of the ad properties of the ad with a binary value;
  (2) concatenating each of the binary values to define a sequence of bits;
  (3) encoding the sequence of bits into a sequence of characters, wherein each of the characters is selected from a set of K legal characters, and
  (4) providing the sequence of characters in the click URL of the ad.

18. The apparatus of claim 17 wherein the act of encoding the sequence of bits into a sequence of characters includes
  i) dividing a number defined by the sequence of bits by K to obtain a result and a remainder,
  ii) selecting one of the K legal characters using the remainder,
  iii) setting the number to the result, and
  iv) repeating acts (i)-(iii) until the result is less than K,

* * * * *